(12) United States Patent
Suumäki et al.

(10) Patent No.: US 8,463,229 B2
(45) Date of Patent: Jun. 11, 2013

(54) COEXISTENCE FOR COGNITIVE RADIO (75) Inventors: Jan Erik Suumäki, Lempäälä (FI); Zexian Li, Espoo (FI); Andrea Bacioccola, Helsinki (FI)

(73) Assignee: Nokia Corporation, Espoo (FI)

( * ) Notice: Subject to any disclaimer, the term of this patent is extended or adjusted under 35 U.S.C. 154(b) by 732 days.

(21) Appl. No.: 12/694,457

(22) Filed: Jan. 27, 2010

(65) Prior Publication Data

US 2011/0183632 A1 Jul. 28, 2011

(51) Int. Cl.
*H04B 1/16* (2006.01)

(52) U.S. Cl.
USPC ............ 455/343.4; 455/426.1; 455/458; 370/478

(58) Field of Classification Search
USPC ............ 455/343.4, 426.1, 458, 515; 370/478, 370/344, 348
See application file for complete search history.

(56) References Cited

U.S. PATENT DOCUMENTS

| | | | |
|---|---|---|---|
| 5,790,974 A * | 8/1998 | Tognazzini | 455/456.5 |
| 6,785,793 B2 * | 8/2004 | Aboulenein et al. | 711/167 |
| 7,418,706 B1 * | 8/2008 | Luo et al. | 718/103 |
| 7,976,786 B2 * | 7/2011 | Damery et al. | 422/211 |
| 2005/0088997 A1 * | 4/2005 | Melpignano | 370/338 |
| 2006/0008035 A1 * | 1/2006 | Larsson | 375/343 |
| 2008/0279137 A1 * | 11/2008 | Pernu et al. | 370/328 |
| 2010/0135248 A1 * | 6/2010 | Aramaki et al. | 370/331 |
| 2011/0032892 A1 * | 2/2011 | Bahl et al. | 370/329 |

FOREIGN PATENT DOCUMENTS

WO WO2008090509 7/2008

* cited by examiner

*Primary Examiner* — Minh D Dao

(74) *Attorney, Agent, or Firm* — Locke Lord LLP (57) ABSTRACT

A system for managing wireless communication in view of other potentially interfering wireless signal sources. Signal-related information may be collected from one or more apparatuses that are participating in a network. The information may then be evaluated in order to determine expected signal activity in the environment in which the apparatuses are operating. In some instances the signal activity may then be compared to a scan schedule utilized, for example, to identify legacy apparatuses operating in the environment. This scan schedule may be altered to avoid potential conflicts that may exist with the expected signal activity. The scan schedule may then be communicated to the networked apparatuses.

19 Claims, 10 Drawing Sheets

COEXISTENCE FOR COGNITIVE RADIO

BACKGROUND

1. Field of Invention

The present invention relates to wireless communication, and in particular, to managing the wireless radio operation in apparatuses that are interacting in a wireless network.

2. Background

Advancements in communication-related technology have helped to proliferate the integration of communication-related functionality in everyday applications. In particular, some ability to interact electronically using wired and/or wireless communication is now expected for many existing and emerging applications. Where wireless communication is being employed, wireless transports may be utilized to send electronic data to multiple destinations. These destinations may reside in different locations, and thus, more than one wireless transport may be employed in a single apparatus in order to address these communication needs. Further, the suppliers and consumers of electronic information may not operate using the same forms of communication, so these apparatuses must be able to change communication configuration in order to support less-flexible applications (e.g., processing, size or power limited apparatuses).

However, while enhanced functionality may be realized through the proliferation of wireless communication, the increasing inclusion of wireless support in different applications will unavoidably result in increased wireless signal traffic. As wireless protocols may operate in the same or similar bandwidths, interference may occur when the protocols operate concurrently. This would especially be the case when transmitters and/or receivers are in close proximity, such as in an apparatus that supports multiple protocols. Moreover, other sources of interference may exist within an operational environment. For example, electromagnetic fields may be generated by electronic apparatuses or power systems. Further, legacy wireless communication signals, such as AM/FM radio and television (TV) broadcast signals, may operate in frequency bands that fall very close to emerging wireless protocols, which may also cause signal interference.

Legacy broadcast signals may be especially problematic when attempting to reuse bandwidth that was traditionally reserved for AM/FM radio and/or TV broadcasts. For example, in the U.S. the Federal Communication Commission (FCC) has decided that TV white space, or the operational frequencies that were previously reserved for TV channels that is not currently in use, is available for unlicensed broadband use. However, operating in these sections of unused TV broadcast spectrum may entail certain requirements and/or impediments. More specifically, in addition to rules prohibiting interference with certain legacy apparatuses that operate within this spectrum, the unlicensed nature of these unused channels means that many apparatuses may be operating in this bandwidth, resulting in potential interference coming from many sources.

SUMMARY

Various example embodiments of the present invention may be directed to a method, apparatus, computer program product and system for managing wireless communication in view of other potentially interfering wireless signal sources. Signal-related information may be collected from one or more apparatuses that are participating in a network. The information may then be evaluated in order to determine expected signal activity in the environment in which the apparatuses are operating. In some instances the signal activity may then be compared to a scan schedule utilized, for example, to identify legacy apparatuses operating in the environment. This scan schedule may be altered to avoid potential conflicts that may exist with the expected signal activity. The scan schedule may then be communicated to the networked apparatuses.

The signal-related information collected from the one or more apparatuses may be derived from various sources. For example, signal-related information may pertain to operations within an apparatus such as apparatus communication abilities/configurations, current apparatus condition (e.g., energy levels, processing load, etc.), apparatus communication scheduling (e.g., planned operations for one or more radios co-located in an apparatus), etc. Environmental and network-related information may also be collected as part of the signal-related information. For example, environmental information may include signal sources (e.g., interference) sensed by the one or more apparatuses, while network-related information may comprise planned interaction between the one or more apparatuses, the identification of new apparatuses in the network, etc.

Signal-related information such as set forth above may be analyzed in order to predict expected signal activity within the environment. The expected signal activity may then be compared to a network scan schedule. In accordance with at least one embodiment of the present invention, a scan schedule may comprise periodic instances during which apparatuses may scan. The apparatuses may scan for signals in the environment that identify apparatuses with which interference should be avoided. In TV white space systems, apparatuses with which interference should be avoided may include legacy apparatuses whose operation is protected per government regulations. To be effective, scanning should take place during periods of minimal signal activity in the environment. In at least one example implementation, signal activity that may conflict with scheduled scan instances may be identified by comparing the scheduled scan instances to the expected signal activity. A conflict may arise if, for example, signal activity is predicted to occur during a scan instance. Any potentially conflicting scan instances may be altered to avoid the conflict. For example, potentially conflicting scan instances may be moved forward in time within the scan schedule so that they are aligned with periods of time where minimal signal activity is expected. The scan schedule may then be transmitted to the one or more apparatuses to update the apparatuses to the most current scan schedule. In accordance with at least one embodiment of the present invention, all apparatuses may then operate using the same scan schedule that executes scanning during periods of minimal signal in the environment.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which.

DESCRIPTION OF EXAMPLE EMBODIMENTS

While the invention has been described below in terms of a multitude of example embodiments, various changes can be made therein without departing from the spirit and scope of the invention, as described in the appended claims.

I. Example System with which Embodiments of the Present Invention May be Implemented An example of a system that is usable for implementing various embodiments of the present invention is disclosed in FIG. 1. The system comprises elements that may be included in, or omitted from, configurations depending, for example, on the requirements of a particular application, and therefore, is not intended to limit present invention in any manner.

Figure 1:
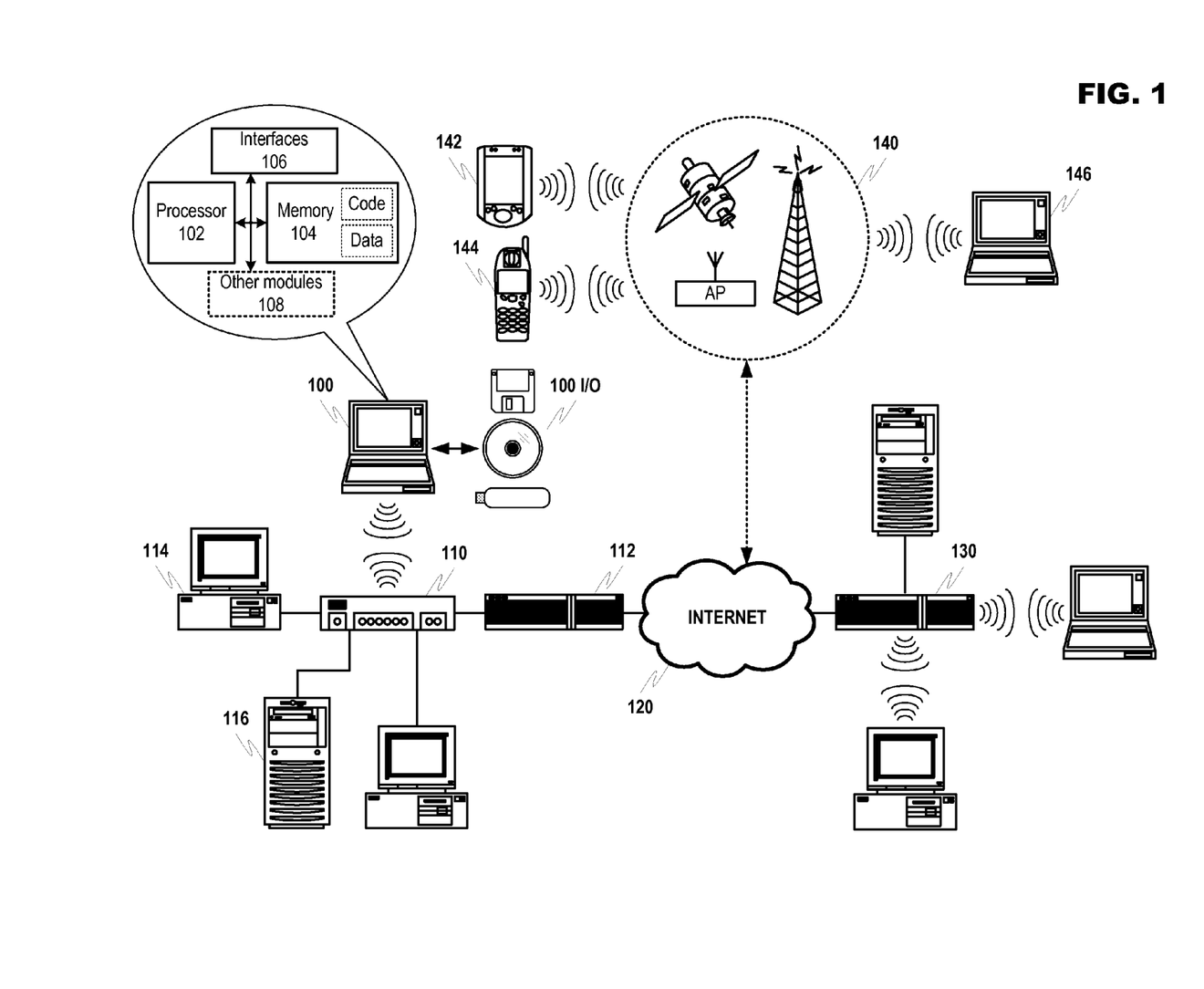
FIG. 1 discloses example apparatuses, communication configuration and network architecture usable in implementing at least one embodiment of the present invention.

Computing device 100 may correspond to various processing-enabled apparatuses including, but not limited to, micro personal computers (UMPC), netbooks, laptop computers, desktop computers, engineering workstations, personal digital assistants (PDA), computerized watches, wired or wireless terminals/nodes/etc., mobile handsets, set-top boxes, personal video recorders (PVR), automatic teller machines (ATM), game consoles, or the like. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 102 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication.

Figure 2:
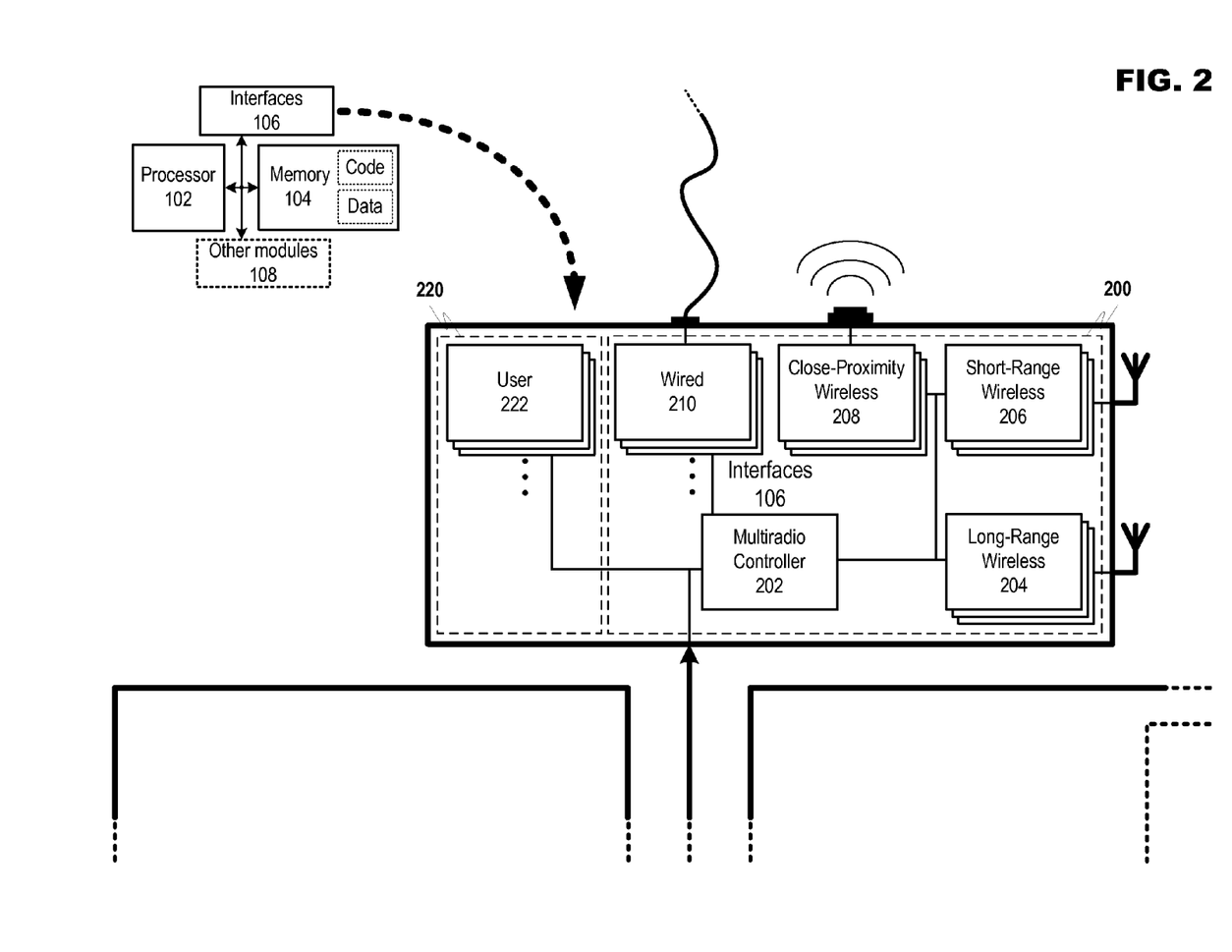
FIG. 2 discloses additional detail with respect to example communication interfaces that may be usable with various embodiments of the present invention.

Further detail regarding example interface component 106 according to one embodiment of the present invention, shown with respect to computing device 100 in FIG. 1, is now discussed with respect to FIG. 2. Initially, interfaces such as disclosed at 106 are not limited to use only with computing device 100, which is utilized herein only for the sake of explanation. As a result, interface features may be implemented in any of the apparatuses that are disclosed in FIG. 1 (e.g., 142, 144, etc.) As previously set forth, interfaces 106 may include interfaces both for communicating data to computing apparatus 100 (e.g., as identified at 200) and other types of interfaces 220 including, for example, user interface 222. A representative group of apparatus-level interfaces is disclosed at 200. For example, multiradio controller 202 may manage the interoperation of long range wireless interfaces 204 (e.g., cellular voice and data networks), short-range wireless interfaces 206 (e.g., Bluetooth and WLAN networks), close-proximity wireless interfaces 208 (e.g., for interactions where electronic, magnetic, electromagnetic and optical information scanners interpret machine-readable data), wired interfaces 210 (e.g., Ethernet), etc. The example interfaces shown in FIG. 2 have been presented only for the sake of explanation herein, and thus, are not intended to limit the various embodiments of the present invention to utilization of any particular interface. Embodiments of the present invention may also utilize interfaces that are not specifically identified in FIG. 2.

Multiradio controller 202 may manage the operation of some or all of interfaces 204-210. For example, multiradio controller 202 may prevent interfaces that could interfere with each other from operating at the same time by allocating specific time periods during which each interface is permitted to operate. Further, multiradio controller 202 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 202 may interact with interfaces 204-210 in FIG. 2.

II. Example Operational Environment

Figure 3:
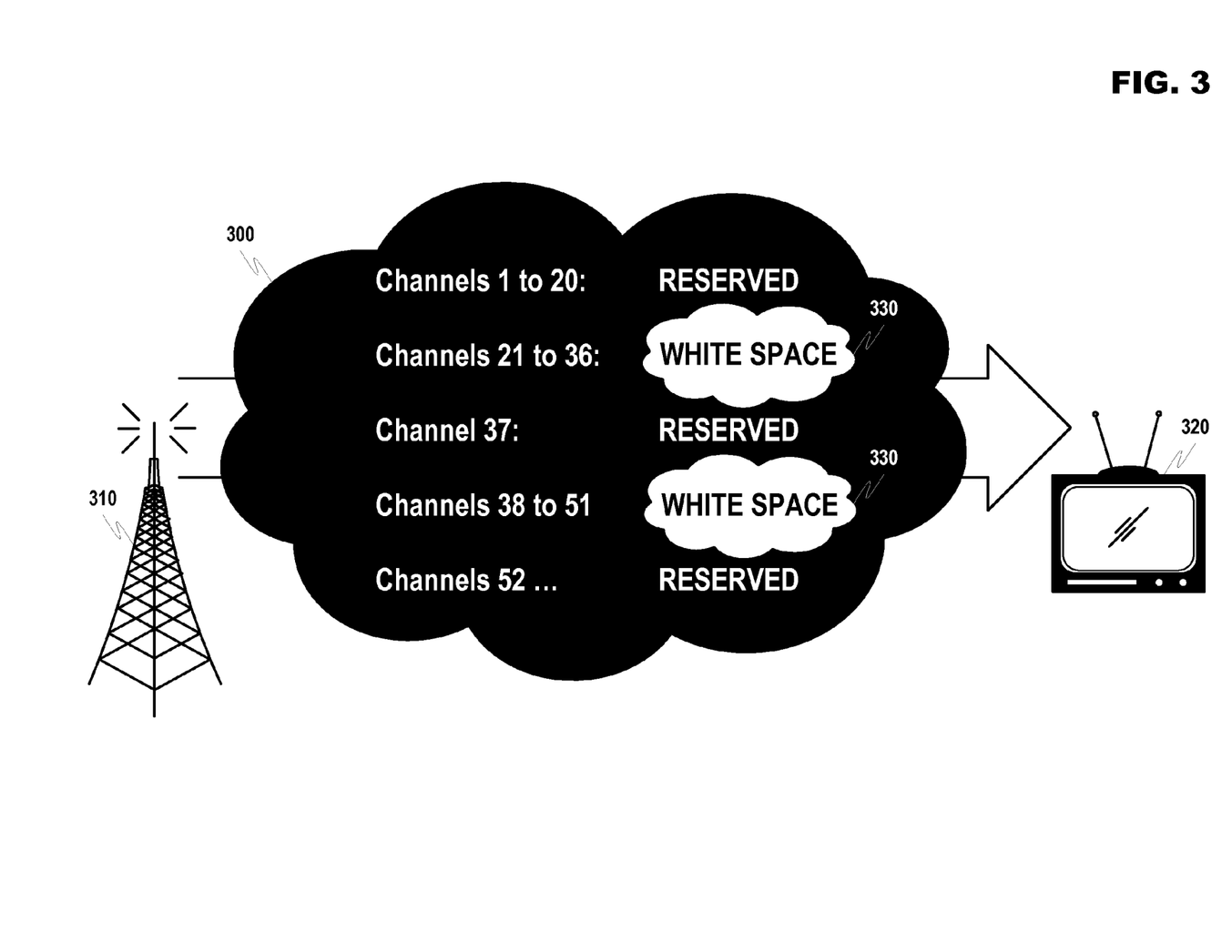
FIG. 3 discloses an example of an operational environment in which at least one embodiment of the present invention may be implemented.

FIG. 3 discloses an example environment that will be utilized for explaining the various embodiments of the present invention. While a TV white space system will be utilized for the sake of example herein, the various example implementations of the present invention that will be disclosed below are not strictly limited only to this operational environment. As a result, various embodiments of the present invention may be applied to different situations that may have somewhat similar characteristics. For instance, such scenarios may include one or more apparatuses interacting wirelessly in an operational environment that is also experiencing substantial signal activity due to other signal sources that are also present in the environment.

FIG. 3 discloses a rudimentary white space system. Initially, bandwidth 300 may be licensed to broadcasters 310. Bandwidth 300 may be separated into channels that are used by broadcasters 310 to send programming to TV 320. For example, each channel may be used by a broadcaster 310 to transmit audio/visual programming to TV 320, by wireless microphones, etc. However, some of bandwidth 300 that is licensed for TV programming may remain unused (e.g., there is no broadcaster using the channel, other signal sources may create interference within the frequency range that defines a channel, etc.). This unused space is identified in FIG. 3 as white space 330. White space 330 may therefore comprise some licensed bandwidth within bandwidth 300 that may be reallocated. TV white space (TVWS) in the U.S. may comprise TV channels 21-51, 470 MHz to 698 MHz, excluding channel 37. As a result, channels 21 to 36 and/or channels 38 to 51 may be reallocated for other uses. An example use for bandwidth 330 may be for unlicensed short-range wireless communication, allowing close-proximity wireless networks to be formed between apparatuses.

Figure 4A:
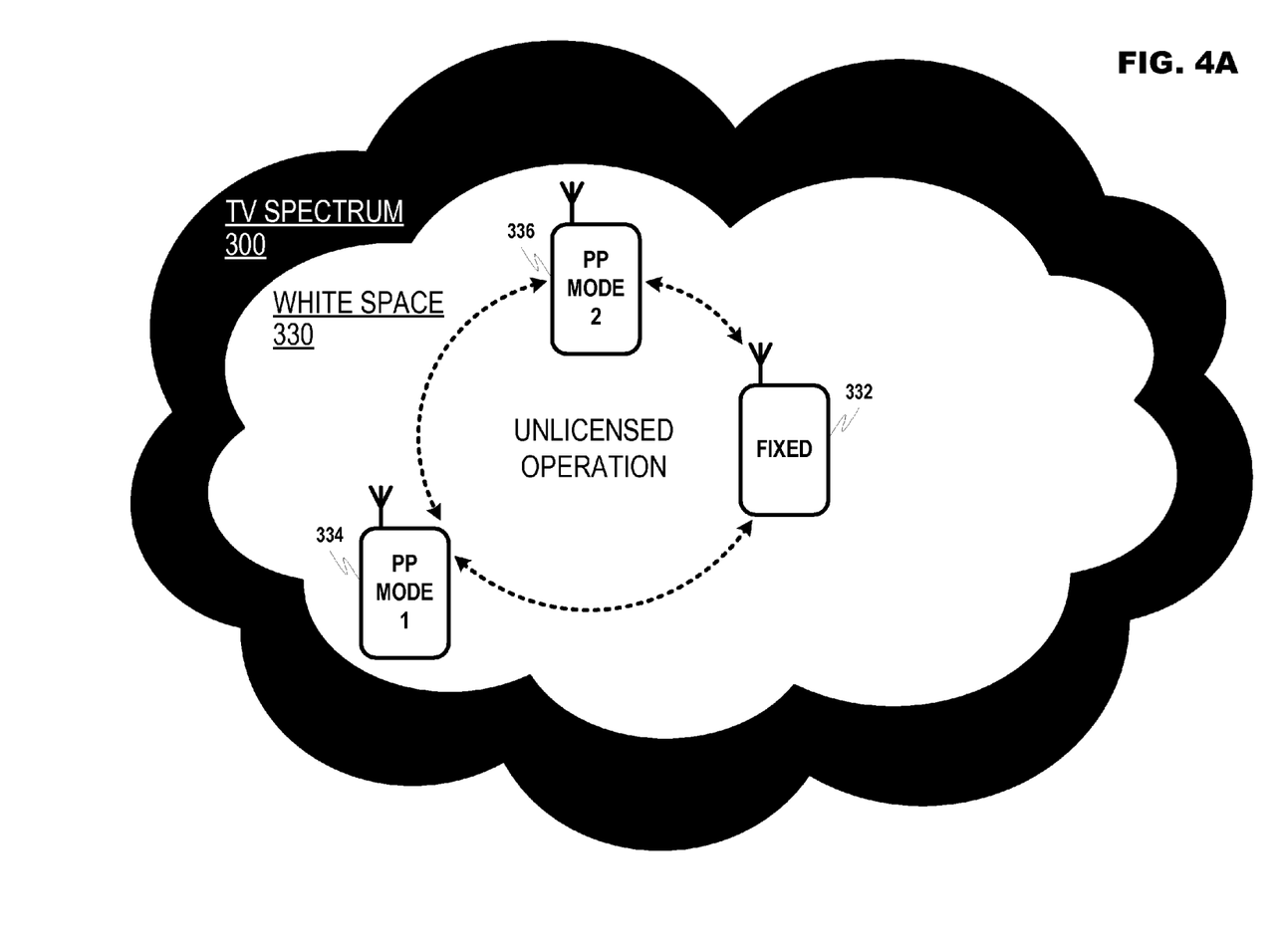
FIG. 4A discloses further detail regarding the example operational environment that was initially disclosed in FIG. 3.

Now referring to FIG. 4A, the example of white space 330 as an environment in which apparatuses may interact is explored further. In TVWS network terminology there may be two categories of apparatus: fixed and personal/portable. Fixed apparatuses 334 are stationary, and thus, have a constant position over time. Personal/portable devices are capable of moving, so their location may vary over time. Furthermore, personal/portable devices are categorized into PP Mode I apparatuses 334 and PP Mode II apparatuses 336. PP Mode II devices 336 can initiate networks (e.g., they can serve as access points in WLAN-type networks) as a master device. PP Mode I devices 334 can only operate as clients of TVWS networks, which may be controlled by either fixed apparatus 332 or PP Mode II device 336. Both fixed apparatuses 332 and personal/portable Mode II devices 336 may utilize spectrum sensing and database access to determine whether or not a channel is occupied by a primary user. In addition, a "special" type of apparatus (not pictured) may also be defined in TVWS networks. Such special apparatuses may be portable and may rely only on spectrum sensing to identify occupied channels.

Figure 4B:
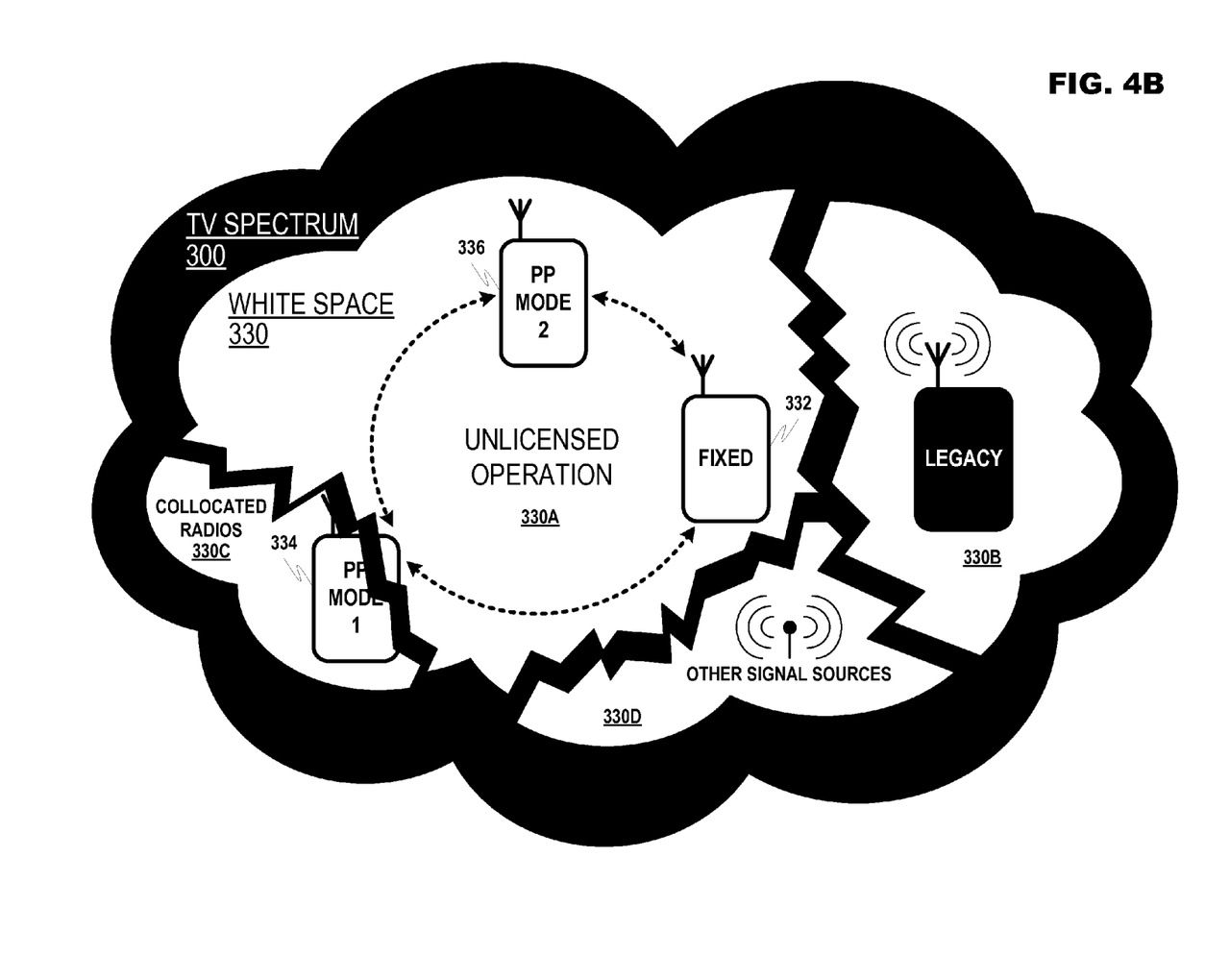
FIG. 4B discloses examples of other potential signal sources that may exist in the example operational environment that was initially disclosed in FIG. 3.

Ideally, apparatuses 332, 334 and 336, as disclosed FIG. 4, may interact freely via wireless communication as long as they remain within the frequency range established for white space 330. However, in practice white space 330 may not be an ideal operational environment. This concept is discussed further with respect to FIG. 4B. In example scenarios where white space 330 is made available for unlicensed short-range wireless communication, many signal sources may exist within this frequency range, and as a result there may be many opportunities for interference to occur between these various sources. Initially, intra-apparatus interference (e.g., interference in an apparatus caused by other functionality occurring in the same apparatus) may exist. Co-located coexistence interference 330C means that devices may contain multiple radios that concurrently support wireless transports operating in proximate frequency bands, or that may otherwise still experience quality problems during simultaneous operation due to, for example, harmonic or inter-modulation interference. In this instance the multiple radios may cause interference between themselves. This is especially a problem if the apparatus is mobile cellular handset or other small factor device since the physical distance between the antennas is insubstantial (e.g., closer antennas=increased interference) and even the smallest leakage power can result in significant performance degradation. Transmission power level may also be a contributor to intra-apparatus interference, which may differ based on type of radio (e.g., cellular radio ~2 W is stronger than short-range unlicensed radio ~100 mW).

The Quality of Service (QoS) delivered by wireless transports may also depend on the sensitivity of the radio technology being employed (e.g., how resistant is the technology to interference). For example, severe co-located interference may occur when a high power radio transmits at the same time when low power radio is receiving. For example, if a device supports both Long Term Evolution (LTE) operating at 700 MHz and TVWS technology using wireless local area network (WLAN) technology where the TVWS channel exists at high end of TV band (e.g., ~690 MHz), the interference between LTE and TVWS technology can be substantial. The aforementioned case is just an example. Other combinations may also prove problematic. For example, other signal sources 330D may comprise apparatuses whose signals are present within the operational environment but are not part of the short-range unlicensed wireless network formed as disclosed at 330A. Other signal sources 330D may comprise, for example, electronic or electromechanical apparatuses whose operation causes electromagnetic field (EMF) interference in the operational environment. Moreover, wireless-enabled apparatuses that are operating close by but are not participating in unlicensed operation 330A may also contribute to signal traffic.

Such wireless-enabled apparatuses may prove extremely problematic in TVWS network systems since there may be very strict sensing requirements of incumbent users (e.g., legacy users 330B). For example, in TVWS systems a device may be requested to sense if a channel is used by a primary user before initiating any communication in that radio channel. Primary users may include, for example, TV broadcasters, wireless microphones or other protected devices. More specifically, the FCC is currently requiring that devices must operate using a −114 dBm detection sensitivity, which may be subject to change depending on various criteria such as updated wireless management regulations, changes in environment (traffic), etc. Sensitivity requirements may also be different depending on region (e.g., vary by country, etc.). As a result, any other co-located radio should interfere less than the above value to avoid false positive detections of primary users. Traditionally it would be impossible to achieve this level of sensitivity without implementing application specific co-located coexistence detection. For this reason, TVWS networking may be considered the first practical application of cognitive radio.

III. Example Cognitive Radio Implementation and Operation

Figure 5:
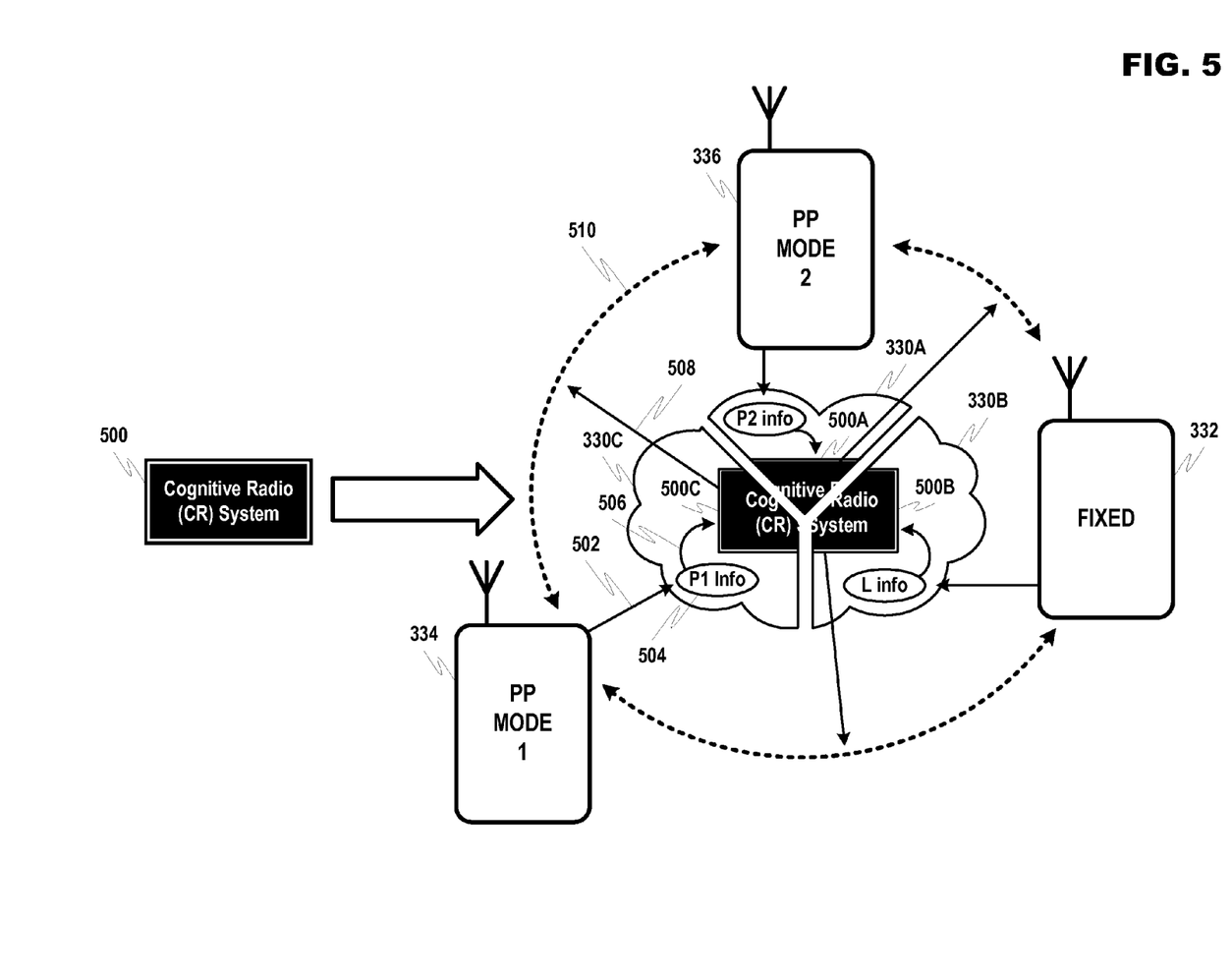
FIG. 5 discloses an example Cognitive Radio (CR) implementation in accordance with at least one embodiment of the present invention.

Cognitive Radio (CR) system 500 is disclosed in an example distributed arrangement in FIG. 5. Initially, a more general explanation of possible CR system operation will be disclosed herein, which is followed by a more specific description of how a CR system may be implemented in accordance with various embodiments of the present invention. More specifically, portions of CR 500 (e.g., 500A to C) may manage communication in operational environment sections 330A to 330C. However, the various example embodiments of the present invention are not specifically limited to the disclosed system, which has been provided for the sake of example herein. For example, CR system 500 may reside completely in a single apparatus or may be distributed amongst various apparatuses as shown at 500A to 500C. Some or all of the apparatuses 332-336 may provide information 504 to CR system 500, as shown at 506, which may use information 504 to formulate communication configuration information pertaining to some or all of apparatuses 332-336. Communication configuration information may comprise one or more preferred configurations for each apparatus (e.g., in the instance of synchronization information) or information usable by apparatuses 332-336 for formulating their own configuration. Configuration information 508 may then be made available to apparatuses 332-336 to facilitate the configuration of network communication.

Figure 6:
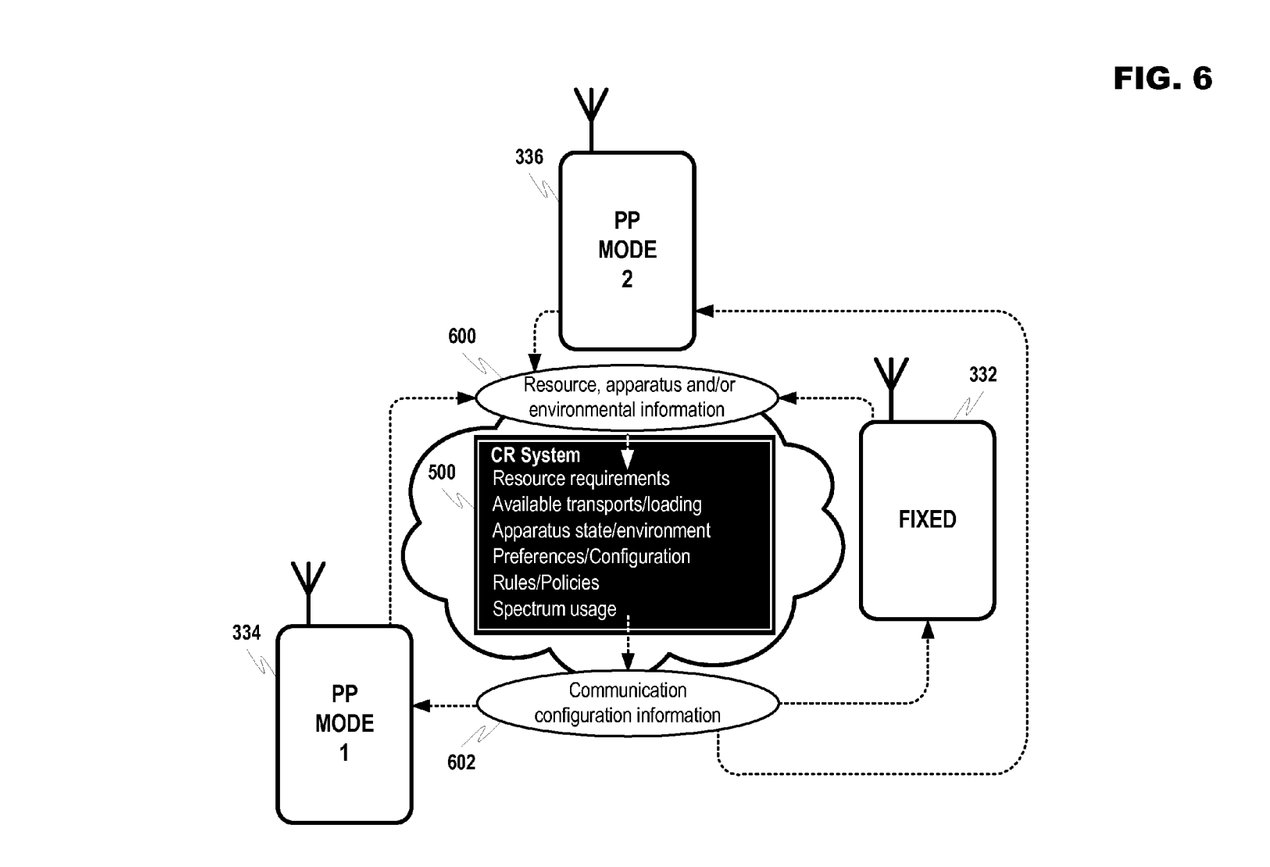
FIG. 6 discloses example criteria that may be taken into consideration when operating a Cognitive Radio (CR) system in accordance with at least one embodiment of the present invention.

FIG. 6 discloses an example methodology by which CR system 500 may formulate communication configuration information according to at least one embodiment of the present invention. Initially decision criteria may be provided at 600, the decision criteria comprising resource, apparatus and/or environmental information. Examples of resource information may include, but are not limited to, applications and/or services residing on an apparatus, hardware components that may be available in an apparatus (e.g., sensors, image capture devices like cameras, etc.), data stored on apparatuses, etc. Apparatus information may comprise, for example, communication transports supported by an apparatus, apparatus security requirements and information pertaining to the current operating condition of an apparatus (e.g., power level, active transports and corresponding traffic/pending messages for each, processor loading, etc.). Environmental information may encompass data obtained by an apparatus regarding the environment in which the apparatus is operating. For example, this type of information may include the current state of the transmission spectrum local to each apparatus or the indication of potential sources of interference in these areas. Potential sources of interference may be identified based on field sensors within the apparatus, packet loss experienced in communications over particular wireless transports, etc.

The decision criteria disclosed, for example, at 600 may be supplied to CR system 500 in response to a request message, may be provided periodically based, for example, on a predetermined time period, in response to changes occurring in the apparatuses, etc. CR system 500 may utilize the received decision criteria in one or more logical determination steps as shown in FIG. 6. For example, CR system 500 may consider the decision criteria in view of resource requirements such as communication link performance requirements (e.g., high speed and/or capacity for multimedia streaming), link security requirements for accessing private and/or sensitive information, etc. CR system 500 may further consider which communication transports are available and the loading of each of these transports system-wide and the current state and/or environmental conditions corresponding to each apparatus. Apparatuses that have limited power and/or processing resources may be slated for communication using transports that help to conserve these resources. Further, apparatuses experiencing interference based on locally active transports or proximately-located sources of interference may be limited to using transports that are immune to these types of interference. Preferences/configuration may comprise non-condition or non-environmental provisions that control transport selection. For example, users may configure WLAN over high-speed cellular transports in order to save power, certain transports may be designated as always having priority (e.g., transport carrying voice data), etc. Rules/Policies may comprise, for example, regulatory rules that the nodes need to follow in their utilization of spectrum. Spectrum usage may further be utilized to determine the frequency spectrums that are preferred (or should be avoided) when establishing new communication links. In accordance with at least one embodiment of the present invention, some or all of these criteria may be employed when implementing communication in a TVWS environment. For example, the rules in CR 500 may protect operation for existing apparatuses by customizing the operation of TVWS apparatuses to avoid interference. Alternatively, rules in CR 500 may protect the operation of TVWS apparatuses by modifying other apparatus operation.

The culmination of the example logical decision steps shown in FIG. 5 may take the form of communication configuration information 502. This information may be provided in various formats, such as possible communication configurations that may be adopted by an apparatus. For example, possible communication configurations may comprise assigning one or more communication transports (e.g., low power) for use in accessing a certain apparatus. Requesting applications and/or required resources may also dictate the selection of transports having specific speed, capacity, error-correction, security characteristics, etc. Further, transports may be excluded from configurations used to access certain apparatuses based on the potential negative impact of interference sources that are local or proximately-located to the apparatus.

In accordance with at least one example embodiment of the present invention, it is also possible for communication configuration information to consist of data that is usable when apparatuses are configuring their own communications. For example, communication transports supported by an apparatus, encryption or error-checking functionality available in an apparatus, local interference information and/or local spectrum utilization information, apparatus condition information, etc. may be made available to other apparatuses that desire to access resources on the apparatus. These other apparatuses may then formulate their own configuration in view of the abilities and/or limitations of the apparatus to which communication is desired. In either situation provided above (e.g., the provision of one or more possible configurations or information usable by apparatuses when configuring a link), the configuration information may be accessed directly by requesting apparatuses (e.g., such as by the apparatuses querying configuration data stored in a particular format), may be provided in one or more messages transmitted from CR system 500 in response to apparatus requests, etc.

IV. Implementation Example

In accordance with at least one embodiment of the present invention, CR system 500 may, alone or in combination with the functional aspects described above, be utilized to convey signal-related information usable for managing wireless communication in one or more apparatuses. Signal related information may pertain to the apparatus itself, such as operational schedule information for one or more radios located in an apparatus, or may pertain to foreign signals sensed by apparatuses in the environment. For example, networked apparatuses may be able to detect signals in the environment that were emitted by non-networked signal sources. This signal information may be evaluated in order to predict overall signal activity in the environment over a period of time. Various embodiments of the present invention may use the predicted signal activity to determine if schedule scans may potentially encounter interference.

Communication management in view of signal-activity present in the operational environment may help to reduce interference (e.g., reduction in bit-errors), which may result in improved radio resource usage, spectrum efficiency and enhanced overall QoS. Such operation may also be part of a communication management strategy to fulfill requirements for partially restricted unlicensed operation, such as the −114 dBm sensing criteria required by the FCC in TVWS networking. In particular, the FCC requires that all TVWS apparatuses shall perform scanning for incumbent (e.g., legacy) apparatuses. At least one challenge presented by this requirement is that the scanning should be performed simultaneously by all apparatuses in a certain geo-location (area) so that there is no TVWS transmission by any TVWS apparatuses in order to avoid interference with the scan. Therefore, the scan timing (e.g., instances where scanning is planned to occur) should be known to all TVWS apparatuses beforehand. Mobile devices may spend large portion of their time in a sleep mode as a power saving measure, and thus, signaling a scan instance just before a sleeping window does not present a feasible solution. As a result, scan intervals typically fall on a predetermined interval negotiated between TVWS apparatuses. Using a fixed interval may be the simplest configuration, however, such a solution does not account for instances when the interval may fall closely in time with legacy apparatus transmission (e.g., possibly masking the ability to sense incumbent apparatuses). Thus, the actual interval may have some variation but will be negotiated between apparatuses beforehand.

Accounting for co-located radio coexistence makes scanning even more difficult. Co-located coexistence can be problematic in that the other co-located non-cognitive radios may not support such scanning periodicity. Co-located radio transmission/reception patterns depend on technology. For example, the Global System for Mobile Communications (GSM) is based on time-division multiplexing (TDM), while the Universal Mobile Telecommunication System (UMTS) is more continuous Wideband Code Division Multiple Access (WCDMA) transmission.

In accordance with at least one embodiment of the present invention, a solution to these challenges may involve a frequency-based optimization strategy. This solution, along with the time-based optimization strategy, will be described with respect to the example disclosed in FIG. 4. In general, apparatuses 334 and 336 may provide apparatus-related information and sensed environmental information to apparatus 332. Apparatus 332 may further receive network-related information (e.g., if the apparatus contains resource management functionality for maintaining the network) and may also sense environmental information itself. Apparatus 332 may then provide control information back to apparatuses 334 and 336.

In embodiments relating to frequency-based optimization, TVWS apparatuses including co-located radios (e.g., TVWS PP mode 1 apparatus 334) may inform (e.g., send reporting messages) comprising preferred channel or frequency information to a TVWS Master apparatus (e.g., fixed apparatus 332), which may consider this information when making channel selection decisions. In view of this information, the TVWS master device may allocate channels which it predicts will result in the least amount interference between TVWS technology and co-located radios, sensed signals in the environment, etc. TVWS apparatuses may also employ a special sensing-only mode in order to determine channel availability. In this mode, devices could form ad-hoc networks without TVWS database access or any centralized control. Apparatuses in this special mode could scan all (or at least a subset of all) of the channels, and the report to each other which channels are sensed as free. This information may be used to create a list of available channels based on sensing results only. This information may be used with the previously described co-located radio information to decide the channels in which the ad-hoc network should operate to minimize interference.

The co-located radio and available channel information may be reported in an abstract manner. For example, the information may simply reference a high/low TV channel (or frequency) as available depending on the frequency of the other radio which may potentially cause interference. In theory, there may also be multiple active radios both above and below TVWS channels. In such cases middle channels may be deemed optimal. Alternatively, the information may be more accurate, like indications to use certain channel number(s), certain frequencies or to operate above/below certain channel numbers. Moreover, in situations where TVWS apparatuses can control channel selection themselves (e.g., PP Mode II devices), these apparatuses may just select the most suitable channel in view of it's own internal selection logic.

In example implementations a TVWS_colocated_channel_req message may be sent to other TVWS apparatuses in the operational environment. This message may comprise fields such as "State" which may indicate activated or deactivated with respect to co-located radios (e.g., this parameter may indicate the start and the stop of co-located radio operation), "Channel Number" X, where X=20-51 may indicate a requested channel which is the highest or lowest allowed for TVWS operation, and "Direction" which may indicate High or Low (e.g., the channels should be avoided). This message may be sent when TVWS apparatuses have two concurrently active radios (e.g., a TVWS radio and another co-located radio) that may potentially interfere with each other or when such concurrent radio operation is stopped. Requested channel info may be taken account when there are available channels for fulfilling a request (or multiple requests from different TVWS apparatuses).

Figure 7:
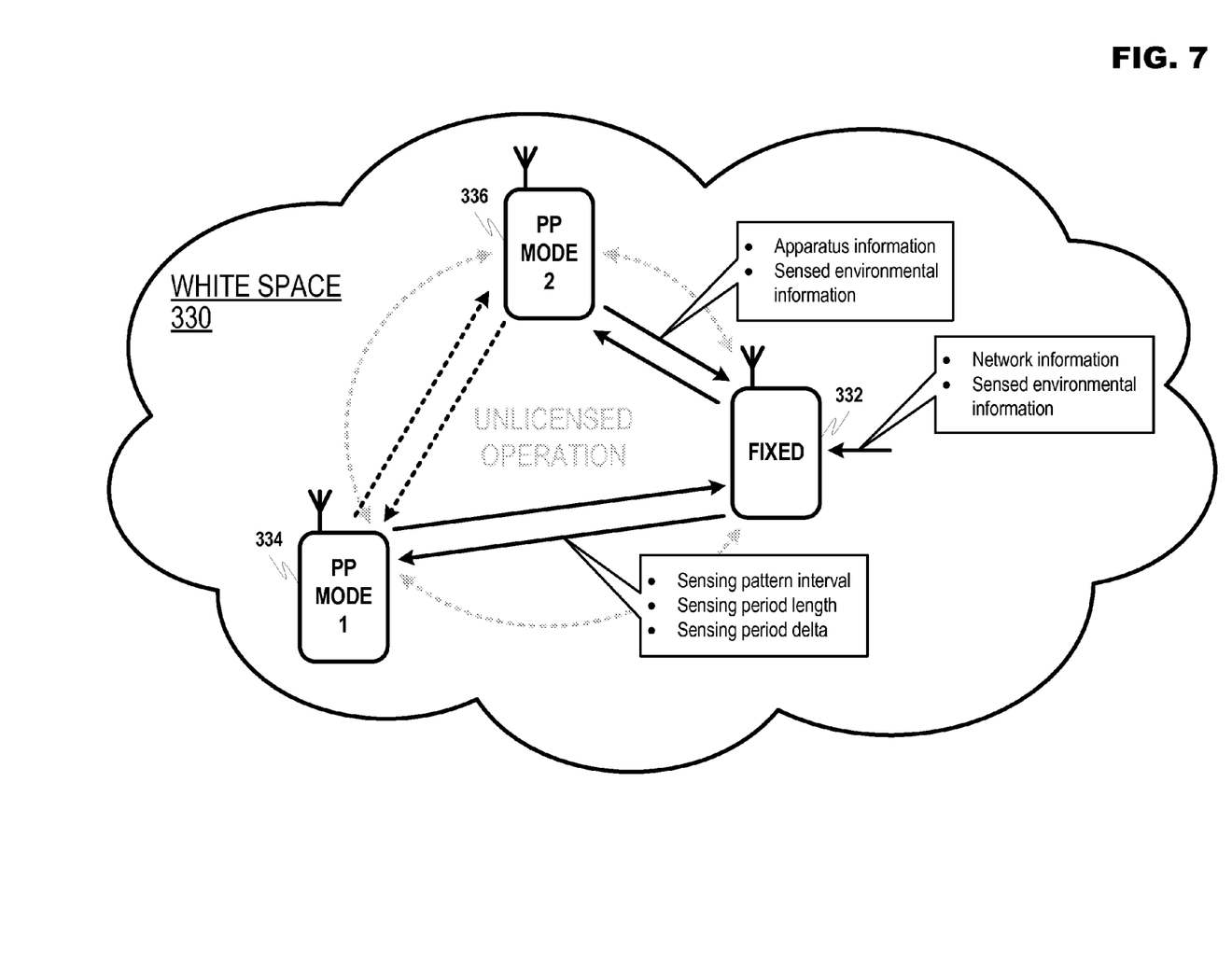
FIG. 7 discloses an example of apparatus interaction within a TVWS environment in accordance with at least one embodiment of the present invention.

In accordance with at least one embodiment of the present invention, time-based optimization is also a control strategy that may be employed in view of the general control example disclosed in FIG. 7. Most radio technologies operate in a manner where breaks occasionally occur in communication activities. Breaks may occur simply due to a lack of transmission (either uplink or downlink) for an apparatus, power saving mechanisms that place apparatuses in sleep/idle modes, etc. In accordance with at least one embodiment of the present invention, these breaks may be used for scanning in TVWS systems (e.g., if the breaks for all apparatuses are aligned). However, the timing of these breaks may not necessarily line up with the previously established (e.g., periodic) scanning instances known in the TVWS network. Using a time based solution, TVWS devices may determine available timing intervals for scanning based on information communicated between the TVWS apparatuses. For example, co-located radio transmission schedules or power saving patterns of apparatuses may be compared to the TVWS scanning schedule (e.g., scanning instances, pre-established scanning interval, etc.). If, for example, the operation of co-located radios may overlap with the sensing period, and such an occurrence may cause the criteria established by the FCC to be violated, then TVWS apparatuses may perform corrective action. For example, if an apparatus cannot control scan interval itself (e.g., operating in a slave role) it may send some or all of the signal and scan schedule information to another TVWS apparatus which may decide how to alter the timing of scan schedule. On the other hand, an apparatus operating in a master role may adjust sensing period and/or instance by itself, which would be especially useful if cooperative control between different TVWS apparatuses is possible.

Figure 8A:
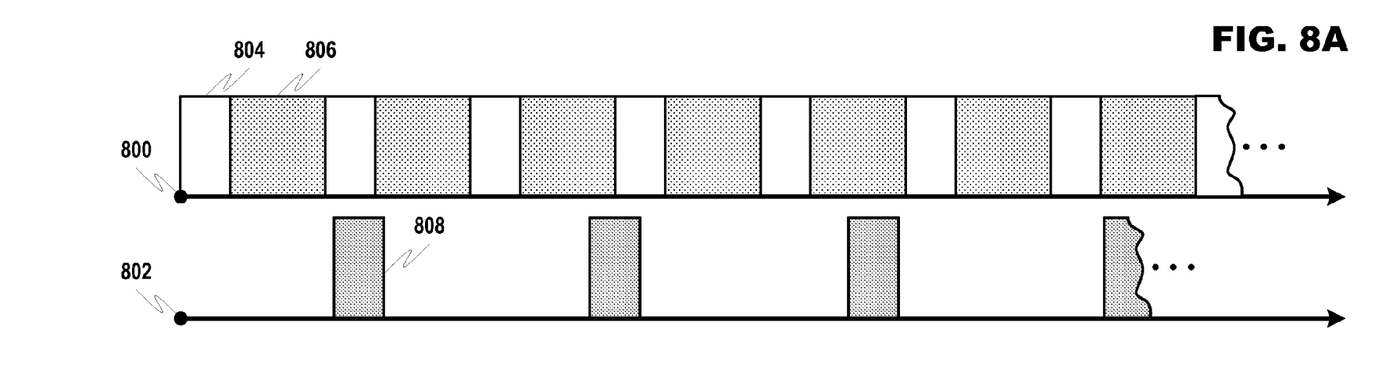
FIG. 8A discloses an example of a scan schedule in accordance with at least one embodiment of the present invention.
Figure 8B:
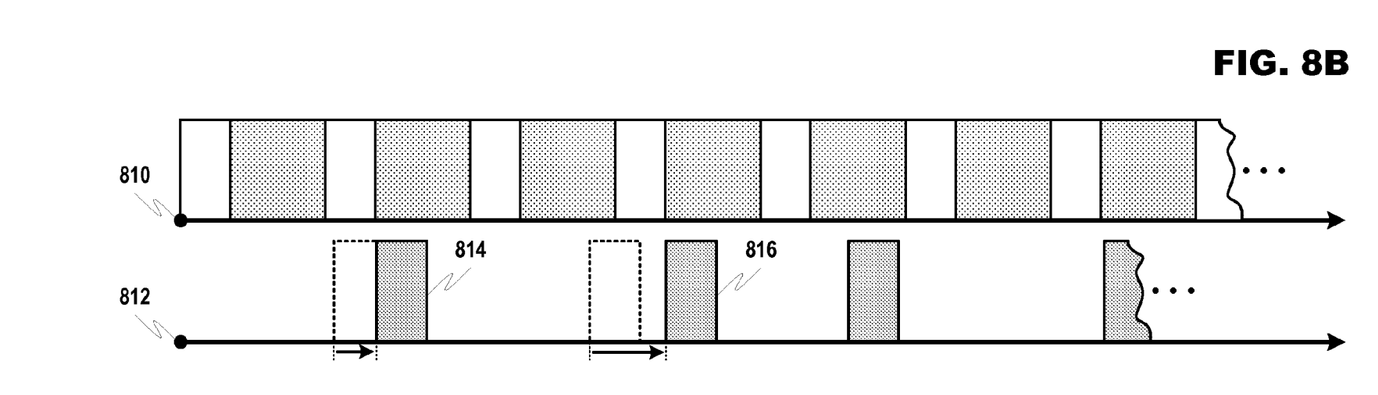
FIG. 8B discloses an example of an altered scan schedule based on the scan schedule of FIG. 8A in accordance with at least one embodiment of the present invention.

In accordance with at least one embodiment of the present invention, an example of scanning schedule adjustment is disclosed in FIGS. 8A and 8B. Signal activity 800 describes reported or sensed signal activity predicted for the environment (e.g., TVWS channel). White blocks 804 may represent planned or expected signal activity, while shaded blocks 806 may represent no signal activity. Further, signal activity 802 may represent the planned scanning schedule for a network of apparatuses (e.g., TVWS network). As is evident from FIG. 8A, some scan instances 808 may take place when other signal activity 804 is planned in the network. This overlap indicates a potential for interference between the signals.

Now referring to FIG. 8B, signal activity 810 again represents the signal activity that is planned or expected in the environment over time. However, in accordance with at least one embodiment of the present invention, signal activity 812 demonstrates how conflicting scan instances may be altered to avoid potential conflicts. In particular, scan instances 814 and 816 have been moved ahead in time in the scan schedule so that they fall during periods where no signal activity is expected or planned. The altered scan schedule may then be communicated to other networked apparatuses. As a result, potential interference between signal activity that is planned or expected in the environment and scheduled scanning instances may be avoided.

Sensing instances and/or intervals may be modified so that the criteria imposed by the FCC are fulfilled by each TVWS apparatus. In cases where multiple TVWS apparatuses may have conflicting scanning timing requests, then alternate scanning periods may be defined so that each TVWS device within network would fulfill FCC requirements. Alternatively, TVWS devices including co-located radios may report the scan instances and/or intervals that should be protected for other radios (e.g., TVWS radios) to the co-located radio scheduling management entity (e.g. fixed apparatus 332 in FIG. 7). While fixed apparatus is disclosed as the co-located radio scheduling management entity in FIG. 7, any apparatus capable of forming a network may also serve in this role. For example, PP mode 2 apparatus 336 could also perform this function, which is signified in FIG. 7 by the dotted-line arrows. If possible, TVWS apparatuses may request breaks in co-located radio transmission even it could not affect actual timing. For example, LTE supports a discontinuous transmission (DTX) feature. If the DTX feature can be negotiated by the TVWS controls within an apparatus, then the TVWS network may use those sleep intervals for scanning.

Some special mode apparatuses that may choose TVWS channels by relying upon their own sensing can also form ad hoc network groups. These apparatuses may actually share their scanning results amongst the ad hoc group. The sensing interval may be longer for special mode apparatuses because these TVWS devices may scan alternatively. For example, if there are three devices and the requirement for sensing is 30 second the sensing order can be device 1, 2, then device 3. The effective sensing period for each device would then be 90 seconds.

Example time-based implementations according to one embodiment of the present invention may provide reporting messages when TVWS apparatuses detect that co-located radio transmission pattern (or a sensed signal) and a TVWS scan schedule will collide. For example, such messages are shown being transmitted from fixed apparatus 332 to PP mode 1 apparatus 334 and PP mode 2 apparatus 336 in FIG. 7. The messages may report possible conflicts or may adjust one or more scan instances in the scan schedule to avoid potential conflicts. Such reporting should be done well in advance (several seconds) due power saving mechanisms. A TVWS_colocated_sensing_time_req message may be sent from TVWS network clients (e.g., PP mode 1 apparatus 334) to a TVWS network master (e.g., fixed apparatus 332) and may comprise fields such as "State" which may indicate activate or deactivate (e.g., this parameter may indicate the start and the stop of the co-located radio operation), "Fixed Pattern" which may indicate Yes or No (e.g., this parameter may indicate whether a co-located radio has fixed transmission pattern), "Pattern interval" X ms indicates periodicity if fixed, and "Delta" Y ms which indicates how much next sensing instance should be moved to avoid collision with a co-located radio or sensed signal. If co-located radio does not have fixed interval, then this request message should be send separately for each sensing period.

Alternatively, TVWS_colocated_sensing_ind messages may be transmitted from a TVWS network Master to TVWS network client (e.g., broadcast to all Clients under Master). This message may comprise fields such as "Sensing Pattern Interval" that may indicate if the sensing pattern is updated or the current sensing pattern is OK to use, "Sensing period length" that may indicate the length of single sensing instance, "Delta" Z ms that may define how much the next sensing instance is to be moved compared to its previously negotiated position. This message assumes that an initial sensing periodicity should be negotiated according to co-located radio transmission pattern. However, if pattern needs to be changed then a second message could be used. If co-located radios do not operate using a fixed time interval, then this broadcast message may be transmitted separately for each scanning period. If there are multiple TVWS apparatuses with active dual radio operation, then the TVWS network master may increase the scanning periodicity so that at least one non-colliding scanning instance is available for every TVWS apparatus during a mandated scanning instance, such as specified for TVWS operation.

Figure 9:
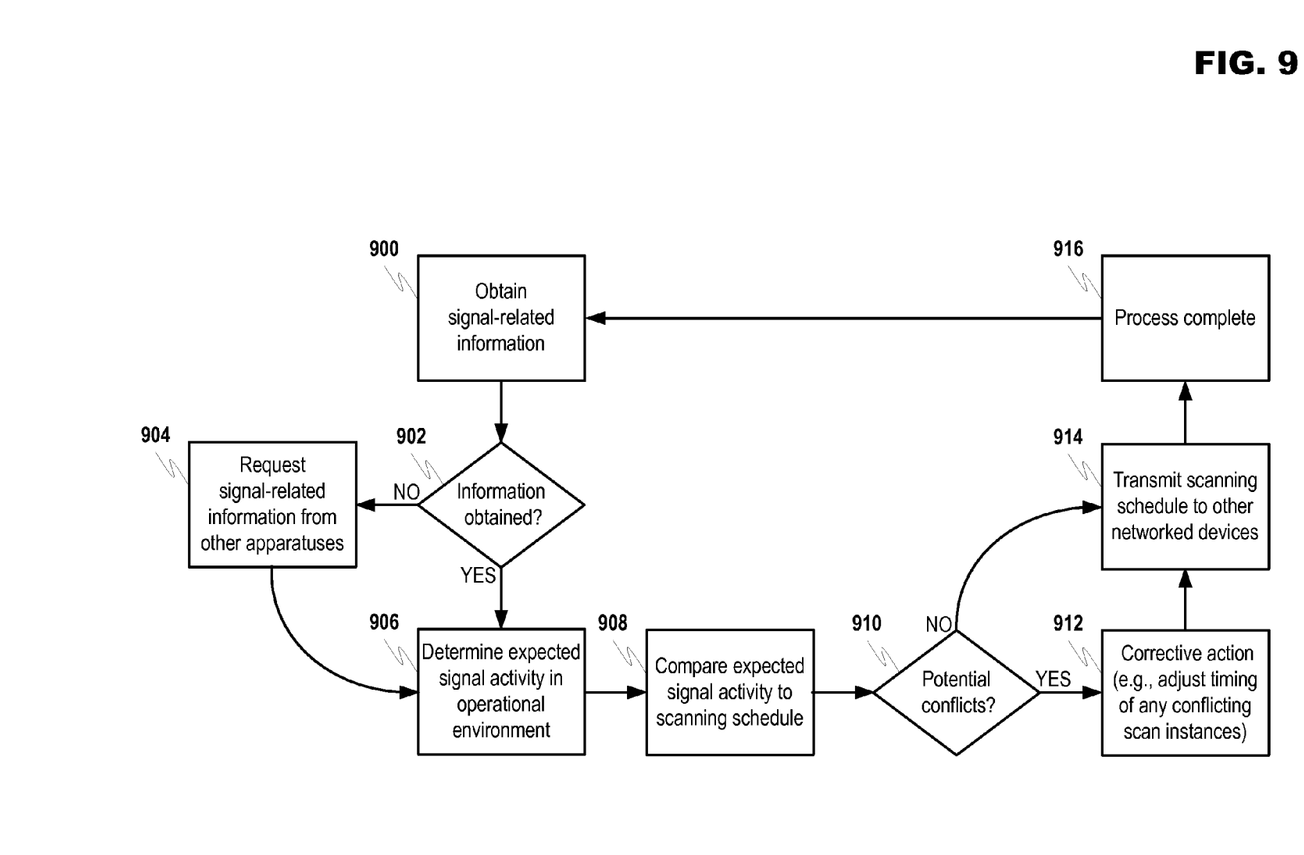
FIG. 9 discloses a flowchart for an example communication configuration process in accordance with at least one embodiment of the present invention.

A flowchart of an example communication management process in accordance with at least one embodiment of the present invention is disclosed in FIG. 9. Initially signal-related information may be obtained in step 900. A master apparatus for a wireless network in the operational environment may receive the signal-related information. The information may be obtained in response to request messages transmitted to networked apparatuses (e.g., TVWS apparatuses), may be transmitted periodically from networked apparatuses, may be transmitted upon realization of a change in the signal-related information, etc. If signal-related information that was expected from an apparatus is not received in step 902, a request (e.g., sometimes an additional request) may be made to the apparatus in step 904. As disclosed in the previous examples, signal related information may pertain to communication activities occurring within an apparatus (e.g., operational schedule information for one or more radios in an apparatus) or may be sensed by an apparatus. Sensed information may include communication signals or simply sensed electronic emissions that are received from apparatuses outside of the network.

The received information may be evaluated in step 906 in order to determine the signal activity that is expected to occur in the operational environment. This determination may, in some instances, be made by the network master apparatus. Moreover, the determination may further comprise evaluating the expected signal activity in order to identify periods of time during which no signal activity is expected. The expected signal activity may then be compared to a scanning schedule in step 908. The scanning schedule may be previously established and known to all of the apparatuses in the network. The scanning schedule may further comprise scan instances during which network scanning is planned to take place. These scan instances may occur periodically at a set interval. The results of step 908 may identify one or more scan instances that are potential conflicts. For example, potential conflicts may exist between the expected signal activity and the scan schedule where a scanning instance is scheduled to take place and signal activity is expected to occur in the operational environment.

If potential conflicts are determined to exist in step 910, the process may proceed to step 912 where correction actions may be executed. Corrective actions may include adjusting the timing of any potentially conflicting scan instances so that the conflicts may be avoided. For example, potentially conflicting scan instances may be moved ahead in the scanning schedule so that they fall during periods of time where no signal activity is expected in the operational environment. The process may then proceed to step 914 where the scanning schedule may be transmitted to other networked devices. For example, if no potential conflicts were identified in step 910 then the scanning schedule may be unchanged from the previously established scanning schedule. However, if the scanning schedule was altered in step 914, the altered scanning schedule may be transmitted in step 914. In accordance with at least one embodiment of the present invention, the message transmitting the adjusted scanning schedule information may indicate that the previously established scanning schedule has been altered. The process may be completed in step 916 and may return to step 900 to prepare for new signal-related information.

While various exemplary configurations of the present invention have been disclosed above, the present invention is not strictly limited to the previous embodiments.

For example, the present invention may include, in accordance with at least one example embodiment, an apparatus comprising means for receiving signal-related information at an apparatus, means for determining signal activity expected in an environment in which the apparatus is operating based on the received signal-related information, means for comparing the expected signal activity to a scan schedule in the apparatus, the scan schedule comprising one or more instances during which scans are scheduled, means for updating the scan schedule by altering timing for any of the one or more scan instances that potentially conflict with the expected signal activity, and means for transmitting information comprising at least the updated scan schedule.

At least one other example embodiment of the present invention may include electronic signals that cause apparatuses to receive signal-related information at an apparatus, determining signal activity expected in an environment in which the apparatus is operating based on the received signal-related information, compare the expected signal activity to a scan schedule in the apparatus, the scan schedule comprising one or more instances during which scans are scheduled, update the scan schedule by altering timing for any of the one or more scan instances that potentially conflict with the expected signal activity, and transmit information comprising at least the updated scan schedule.

Accordingly, it will be apparent to persons skilled in the relevant art that various changes in form a and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
receiving signal-related information at an apparatus;
determining signal activity expected in an environment in which the apparatus is operating based on the received signal-related information;
comparing the expected signal activity to a scan schedule in the apparatus, the scan schedule comprising one or more instances during which scans are scheduled;
updating the scan schedule by altering timing for any of the one or more scan instances that potentially conflict with the expected signal activity; and
transmitting information comprising at least the updated scan schedule,
wherein the signal-related information is received from, and the updated scan schedule information is transmitted to, other apparatuses in a same cognitive radio network as the apparatus, and
wherein the updated scan schedule is configured to enable scanning for available bandwidth in which to operate in a television white space.

2. The method of claim 1, wherein the signal-related information is received via wireless communication from one or more other apparatuses operating in the environment.

3. The method of claim 2, wherein the signal-related information comprises schedule information for radios in the one or more other apparatuses.

4. The method of claim 2, wherein the signal-related information comprises signals in the environment sensed by the one or more other apparatuses.

5. The method of claim 1, wherein determining expected signal activity comprises identifying any periods of time when no signal activity is expected in the environment.

6. The method of claim 5, wherein altering timing for any of the one or more scan instances comprises moving any potentially conflicting scan instances forward in the scan schedule to align with any periods of time when no signal activity is expected in the environment.

7. A computer program product comprising computer executable program code recorded on a non-transitory computer readable storage medium, the computer executable program code comprising:
- code configured to cause an apparatus to receive signal-related information at an apparatus;
- code configured to cause an apparatus to determine signal activity expected in an environment in which the apparatus is operating based on the received signal-related information;
- code configured to cause an apparatus to compare the expected signal activity to a scan schedule in the apparatus, the scan schedule comprising one or more instances during which scans are scheduled;
- code configured to cause an apparatus to update the scan schedule by altering timing for any of the one or more scan instances that potentially conflict with the expected signal activity; and
- code configured to cause an apparatus to transmit information comprising at least the updated scan schedule,
- wherein the signal-related information is received from, and the updated scan schedule information is transmitted to, other apparatuses in a same cognitive radio network as the apparatus, and
- wherein the updated scan schedule is configured to enable scanning for available bandwidth in which to operate in a television white space.

8. The computer program product of claim 7, wherein the signal-related information is received via wireless communication from one or more other apparatuses operating in the environment.

9. The computer program product of claim 8, wherein the signal-related information comprises schedule information for radios in the one or more other apparatuses.

10. The computer program product of claim 8, wherein the signal-related information comprises signals in the environment sensed by the one or more other apparatuses.

11. The computer program product of claim 7, wherein determining expected signal activity comprises identifying any periods of time when no signal activity is expected in the environment.

12. The computer program product of claim 11, wherein altering timing for any of the one or more scan instances comprises moving any potentially conflicting scan instances forward in the scan schedule to align with any periods of time when no signal activity is expected in the environment.

13. An apparatus, comprising:
- at least one processor; and
- at least one memory including executable instructions, the at least one memory and the executable instructions being configured to, in cooperation with the at least one processor, cause the apparatus to perform at least the following:
  - receive signal-related information at the apparatus;
  - determine signal activity expected in an environment in which the apparatus is operating based on the received signal-related information;
  - compare the expected signal activity to a scan schedule in the apparatus, the scan schedule comprising one or more instances during which scans are scheduled;
  - update the scan schedule by altering timing for any of the one or more scan instances that potentially conflict with the expected signal activity; and
  - transmit information comprising at least the updated scan schedule,
- wherein the signal-related information is received from, and the updated scan schedule information is transmitted to, other apparatuses in a same cognitive radio network as the apparatus, and
- wherein the updated scan schedule is configured to enable scanning for available bandwidth in which to operate in a television white space.

14. The apparatus of claim 13, wherein the signal-related information is received via wireless communication from one or more other apparatuses operating in the environment.

15. The apparatus of claim 14, wherein the signal-related information comprises schedule information for radios in the one or more other apparatuses.

16. The apparatus of claim 14, wherein the signal-related information comprises signals in the environment sensed by the one or more other apparatuses.

17. The apparatus of claim 13, wherein determining expected signal activity comprises identifying any periods of time when no signal activity is expected in the environment.

18. The apparatus of claim 17, wherein altering timing for any of the one or more scan instances comprises moving any potentially conflicting scan instances forward in the scan schedule to align with any periods of time when no signal activity is expected in the environment.

19. A system, comprising:
- an apparatus configured to operate in an environment comprising one or more other apparatuses;
- the apparatus further configured to receive signal-related information from the one or more other apparatuses and determine signal activity expected in the environment in which the apparatus is operating based on the received signal-related information;
- the apparatus further configured to compare the expected signal activity to a scan schedule in the apparatus, the scan schedule comprising one or more instances during which scans are scheduled and update the scan schedule by altering timing for any of the one or more scan instances that potentially conflict with the expected signal activity; and
- the apparatus further configured to transmit information comprising at least the updated scan schedule to the one or more other apparatuses,
- wherein the signal-related information is received from, and the updated scan schedule information is transmitted to, the one or more other apparatuses in a same cognitive radio network as the apparatus, and
- wherein the updated scan schedule is configured to enable scanning for available bandwidth in which to operate in a television white space.

* * * * *